June 30, 1970   A. J. D. STRAUS   3,517,768
FOCUSING SYSTEM FOR DUAL TRANSDUCER LOGGING TOOL
Filed Sept. 3, 1968   2 Sheets-Sheet 1

INVENTOR.
Andrew J. D. Straus
BY
Arthur F. Zobal
ATTORNEY

INVENTOR.
Andrew J.D. Straus (# 3,517,768)

3,517,768
FOCUSING SYSTEM FOR DUAL TRANSDUCER LOGGING TOOL
Andrew J. D. Straus, Dallas, Tex., assignor to Mobil Oil Corporation, a corporation of New York
Filed Sept. 3, 1968, Ser. No. 756,805
Int. Cl. G01v 1/40
U.S. Cl. 181—.5          4 Claims

ABSTRACT OF THE DISCLOSURE

The specification discloses a transducer assembly supported for rotation in a borehole tool and including a directional acoustic transmitter and a directionally sensitive receiver spaced from each other and operated respectively to transmit acoustic pulses to the borehole wall and to detect reflected acoustic energy. Means is provided for varying the angular relationship between the transmitter and receiver to obtain an optimum reflected signal even though the borehole diameter may vary. This means is controlled from the surface whereby focusing may be carried out while the tool is in the borehole.

BACKGROUND OF THE INVENTION

This invention relates to a focusing system in a borehole logging tool which may be operated while the tool is in a borehole to vary the focus of a transmitter and separate receiver employed in the tool for carrying out logging operations.

In U.S. Pat. No. 3,369,626 there is a disclosed an acoustic borehole logging system for scanning the walls of a borehole periodically with acoustic energy for obtaining information of interest. In one embodiment, the scanning operations are carried out with an acoustic transmitter and a separate receiver which are rotated in the borehole tool. During rotation, the transmitter is periodically actuated to produce acoustic pulses which are applied to the borehole wall. Reflected energy is detected by the receiver between acoustic pulses and converted into signals which are recorded to obtain the desired information.

In order to obtain good resolution which is needed to locate and define fractures in the borehole wall, the transmitter and receiver should be focused whereby the maximum amplitude signal reflected from the borehole wall is detected.

SUMMARY OF THE INVENTION

In accordance with the present invention there is provided, in a logging tool containing an energy transmitter and spaced receiver, a downhole system for focusing the transmitter and receiver while the tool is in the borehole. This system varies the angular relationship between the transmitter and receiver to obtain an optimum reflected signal. In many wells the borehole diameter varies in size, for example, due to washouts, etc. Thus, focusing may be required a number of times while logging a well. Since the present invention allows focusing to be carried out while the tool is downhole, it has advantages from an economic standpoint in that it eliminates the necessity of pulling the tool to the surface each time that focusing is necessary, thereby minimizing the logging time.

In accordance with a further aspect of the present invention a monitor device is coupled to the receiver for monitoring its output to ensure that the transmitter and receiver are focused whereby an optimum reflected signal is detected. A control system located at the surface is coupled to the downhole focusing system for controlling the focusing thereof.

In the embodiment disclosed the transmitter and receiver are pivotally supported about two spaced axes parallel to each other and perpendicular to the tool axis. The focusing system comprises a shaft having left-hand and right-hand threads driven by a gear arrangement and a reversing type motor for varying the angular position of the transmitter and receiver simultaneously.

DESCRIPTION OF THE PREFERRED EMBODIMENTS

Figures 1, 6:
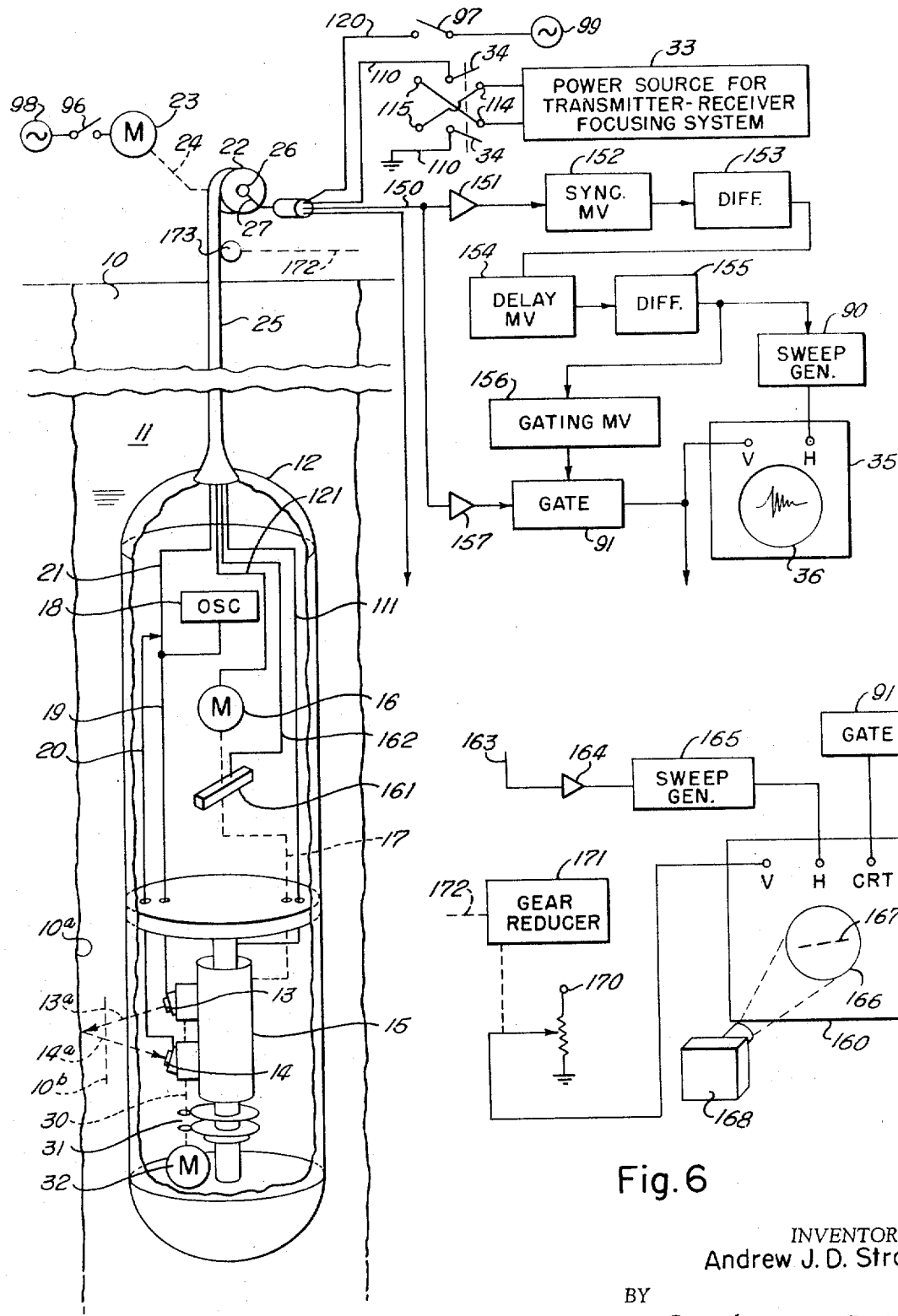
FIG. 1 illustrates the present invention employed in one type of borehole logging system.
FIG. 6 illustrates an uphole recording system.

Referring now to FIG. 1, there will be described briefly the borehole system employed for carrying out logging operations in a borehole illustrated at 10 and containing borehole fluid 11. The borehole system comprises a borehole tool 12 having an acoustic transmitter 13 and an acoustic receiver 14, both of which are mounted on a sleeve 15. This sleeve is rotated by motor 16 and mechanical drive illustrated at 17 described in detail in U.S. Pat. No. 3,378,097. During each cycle of rotation, oscillator 18, which is coupled to the transmitter 13 by way of conductor 19 and slip rings (not shown), periodically actuates the transmitter for the production of the acoustic pulses at a rate of about 2,000 pulses per minute. These pulses are transmitted to the borehole wall 10a by way of a narrow path, illustrated at 13a, through the borehole fluid 11. Between transmitted acoustic pulses, reflected energy, reflected along a path illustrated at 14a, is detected by the receiver 14 which is a directionally sensitive receiver. The resulting receiver signals are applied by way of slip rings (not shown) to conductor 20 from which they are applied to cable conductor 21 for transmission to the surface. Simultaneously with the actuation of the transmitter 13, oscillator 18 produces sync pulses which are also applied to the surface by way of conductor 21.

During logging operations, drum 22 driven by motor 23 and connection 24 winds and unwinds the supporting cable 25 to move the tool 12 continuously through the borehole. At the surface, the various pulses and signals are taken from the cable conductors by way of slip rings and brushes illustrated, respectively, at 26 and 27.

The focusing arrangement in the embodiment disclosed comprises an arrangement for varying the angular relationship between the transmitter and receiver while the tool is in the borehole. In this respect, the transmitter 13 and receiver 14 are supported for pivotal movement about axes parallel to each other and perpendicular to the longitudinal axis of the tool 12. A mechanical shaft 30 threadedly coupled to the transmitter and receiver support structure is employed to rotate the transmitter and receiver about their axes for focusing purposes. The shaft 30 is driven by an arrangement including a magnetic clutch assembly illustrated at 31 and a motor 32. The motor 32 and the magnetic clutch are supplied with power from power supply 33 located at the surface and are controlled from the surface by ganged switches 34. Also located at the surface is a monitoring scope 35 which displays the received signal on its screen 36, thereby enabling the operator to determine when the transmitter and receiver are in focus.

In carrying out focusing operations, the transmitter 13 and receiver 14 are rotated or pivoted until the path 14a of the reflected beam of acoustic energy in the plane formed by the transmitter, receiver, and the point of reflection, extends toward the receiver 14 as illustrated in FIG. 1. At this position, the receiver 14 will detect the maximum amplitude reflected signal within its operating plane. If the borehole diameter decreases whereby the borehole wall changes, for example, to position 10b, refocusing is required in order to obtain an optimum signal since the path of maximum reflected energy from position 10b will fall short of the receiver 14. In order to refocus, the transmitter 13 and receiver 14 are rotated toward each other to change the point of reflection between the transmitter and receiver whereby the reflected beam extends toward the receiver.

Figure 2:
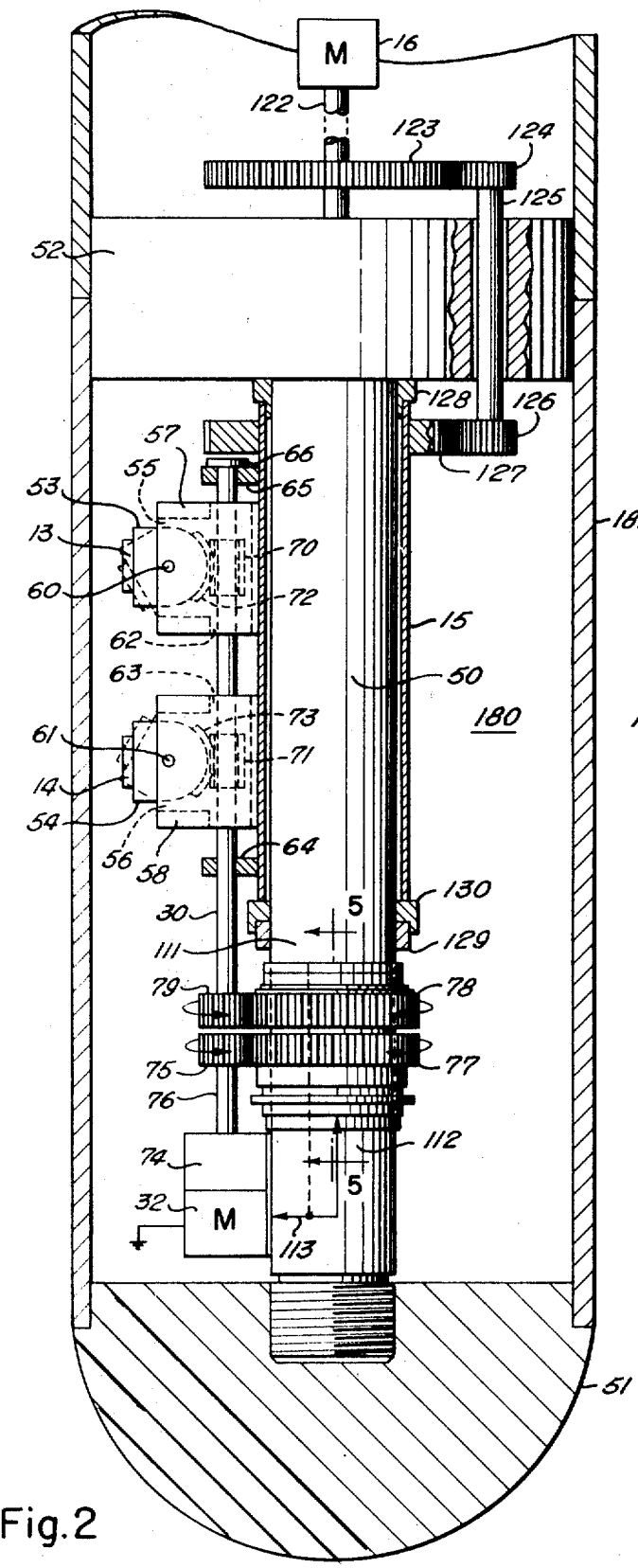
FIG. 2 illustrates in more detail the focusing system of FIG. 1.
Figure 3:
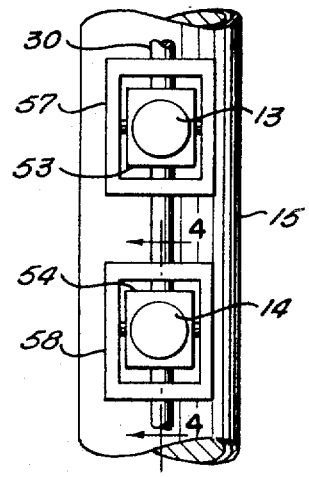
FIG. 3 illustrates a front view of the downhole transmitter and receiver assembly.
Figure 4:
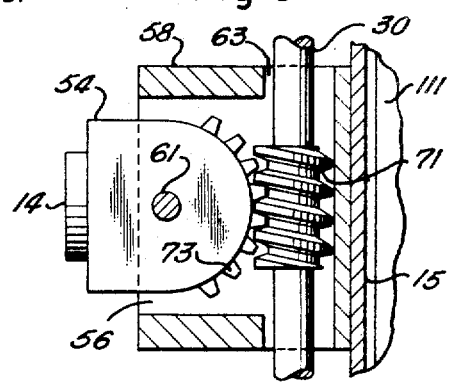
FIG. 4 illustrates an enlarged cross section of a portion of the system of FIG. 2.

Referring to FIG. 2, the downhole focusing system as well as the downhole logging system will be described in more detail. The sleeve 15 is rotated about rod 50 which connects end member 51 to structure 52. The transmitter 13 and receiver 14 are secured to pivotal members 53 and 54, respectively. These members in turn are pivotally supported in slots 55 and 56 formed in blocks 57 and 58. The slot 56 formed in block 58 is illustrated more clearly in FIG. 4. Rods 60 and 61 are employed to support the pivotal members 53 and 54 for angular movement within the slots 55 and 56. Blocks 57 and 58 are secured rigidly to the sleeve 15 and hence rotate with the sleeve. Extending through apertures 62 and 63 formed through blocks 57 and 58 is shaft 30 which also rotates with the sleeve 15. Bearing members 64 and 65 and end member 66 are provided for coupling the shaft 30 to the sleeve 15 and for supporting the shaft 30 for rotation about its own axis. Shaft 30 has right-hand threads 70 and left-hand threads 71, which mesh with threads 72 and 73, respectively, formed at the back ends of pivotal members 53 and 54. Rotation of the shaft 30 about its axis in one direction will cause pivotal members 53 and 54 and hence the transmitter 13 and receiver 14 to rotate toward each other, while rotation of the shaft 30 in the opposite direction about its axis will cause transmitter 13 and receiver 14 to rotate away from each other. Thus, the transmitter and receiver may be focused by rotating the shaft 30 in the proper direction until an optimum signal is obtained from receiver 14. This generally occurs when the point of reflection on the borehole wall is at the level midway between the transmittter and receiver.

Reversible motor 32, gear reducer 74, and a gear train are provided for imparting rotation to shaft 30 about its axis for focusing the transmitter and receiver. The gear train comprises gear 75 formed at the end of gear reducer shaft 76, gears 77 and 78, and gear 79 formed on shaft 30. Focusing is carried out while sleeve 15 is stationary and not rotating. In this respect, the magnetic clutch 31 incorporated in gears 77 and 78 is employed to allow torque to be transmitted from gear 77 to gear 78 and hence from gear 75 to gear 79 for focusing purposes. This clutch also allows gears 77 and 78 to be separated from each other during logging operations whereby sleeve 15 and hence the transmitter and receiver may be rotated about rod 50 unimpeded.

Figure 5:
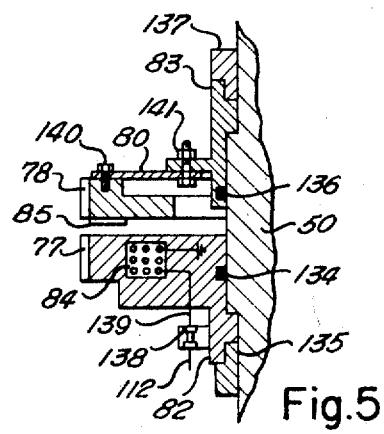
FIG. 5 illustrates an enlarged cross section of FIG. 2 taken along the line 5—5.

Referring to FIG. 5, the magnetic clutch assembly is shown in more detail. Gear 78 normally is biased by supporting spring plate 80 away from gear 77, whereby the gears 77 and 78 do not engage each other during rotation of the sleeve 15. Gears 77 and 78 are supported by collars 82 and 83 for free rotational movement about rod 50 when the clutch is disengaged. As sleeve 15 rotates, gears 79 and 78 are locked together and turn with the sleeve. Since gear 78 is disengaged from gear 77 during this period, gears 77 and 78 do not interfere with rotation of the sleeve 15. Shaft 30 will not rotate about its own axis during rotation of sleeve 15 due to frictional forces, for example, between threads 70–72 and 71–73 and between bearing members 64 and 65 and shaft 30.

When it is desired to focus the transmitter and receiver, the sleeve 15 is stopped from rotating and the clutch is engaged by energizing coil 84. This causes a magnetic force to be produced which pulls gear 78 toward gear 77 whereby the friction lining 85 secured to the inner face of gear 78 is brought into contact with gear 77. Thus, torque is transmitted from gear 77 to gear 78 whereby rotation of gear reducer 74 by motor 32 will cause rotation of shaft 30.

As indicated above, the optimum focusing position for the transmitter and receiver may be obtained by observing or monitoring the signal displayed on the screen 36 of the scope 35 (FIG. 1). In this respect, the sync produced during each pulsing operation is employed to trigger the sweep generator 90 (FIG. 1) which is applied to the horizontal deflection plate of the scope 35. The received signal is applied by way of gate 91 to the vertical deflection plate of the scope 35. Thus, the amplitude of the signal detected by the receiver will be displayed as a function of time across the face of the screen 36. By observing the amplitude of this signal, one can determine if the transmitter and receiver are focused. At an optimum focusing position, the signal amplitude will be at a maximum.

Since the transmitter 13 is operated to produce acoustic pulses at a repetition rate of about 2,000 pulses per minute and since the transmitter and receiver are rotated about rod 50 at a rate of about 180 revolutions per minute, monitoring may be carried out during logging operations. A change in signal amplitude will indicate that the transmitter and receiver are no longer focused at an optimum position and that the borehole diameter has changed, for example, due to a washout. Prior to focusing, vertical movements of the tool 12 and rotational movement of the sleeve 15 are stopped by opening switches 96 and 97 to disconnect power supplies 98 and 99, respectively, from motors 23 and 16.

The transmitter and receiver then are operated at a stationary position in the borehole in one direction, and the motor 32 and the clutch 31 are energized to swing the transmitter and the receiver about their rotational axes 60 and 61, respectively, to obtain an optimum signal amplitude on the screen 36 of the scope 35 as indicated above. The angle through which the transmitter and receiver must be swung to obtain an optimum signal will give an indication as to the extent of borehole diameter change in the direction in which refocusing is carried out. After refocusing in the one direction, the motor 32 and the clutch 31 will be de-energized and the motor 16 energized to rotate the transmitter and receiver about rod 50 while they are operating to determine whether the same optimum signal will be obtained in different directions. This will allow one to determine whether the change in diameter is the same around the borehole. Further focusing may be required to obtain the best average signal around the borehole wall. After focusing is carried out, motors 16 and 23 will be energized to move the tool 12 and rotate the transmitter and receiver to continue logging operations.

As indicated above, ganged switches 34 are employed to control downhole clutch 31 and motor 32. Power is applied to the clutch 31 and motor 32 from supply 33 by way of switches 34, conductors 110 (one of the latter of which is grounded to the cable conductor shield), the uphole slip rings and brushes 26 and 27, conductor 111, and conductors 112 and 113. In the tool, conductor 111 extends through rod 50 to clutch 31 and motor 32. Contact of switches 34 with terminals 114 or 115 will simultaneously energize clutch 31 and motor 32. Contact with terminal 114 connects the main winding of the motor 32 to the supply 33 in one direction, while contact with terminal 115 connects the main winding of the motor 32 to the supply 33 in the reverse direction. Thus, the motor 32 and hence the shaft 30 may be driven in opposite directions to swing the transmitter and receiver either toward or away from each other for proper focusing.

Now that the invention has been described, other details of the logging system will be explained. Power is supplied to downhole motor 16 from power supply 99 by way of switch 97, conductor 120, the slip rings and brushes 26 and 27, and cable conductor 121. Referring to FIG. 2, the motor 16 drives the sleeve 15 by way of shaft 122, gears 123 and 124, shaft 125, and gears 126 and 127, the latter gear of which is rigidly coupled to the sleeve 15. The sleeve 15 is supported for rotation by bearing members 128 and 129 which may be secured to the rod 50 by way of set screws (not shown). The lower portion of the sleeve 15 is secured to ring 130 which is mounted on bearing member 129.

Referring to FIG. 5, collars 82 and 83 are supported for rotation about rod 50 by bearing members 134–135 and 136–137, respectively. Bearing members 135 and 137 may be secured to the rod 50 by set screws (not shown). Current is applied to the coil 84 from conductor 112 by way of slip rings 138 and conductor 139. The spring plate 80 is coupled to gear 78 and to collar 83 by connecting members 140 and 141.

Referring again to FIG. 1, the sync pulses and receiver signals are taken from cable conductor 21 by way of the slip ring and brush assembly 26 and 27 and applied to conductor 150. The sync pulses are amplified by amplifier 151 and applied to a sync multivibrator 152. This multivibrator produces a square-wave pulse of a relatively long duration which prevents spurious signals or receiver signals from coming through during the time of its production. This square wave is differentiated at 153 and the pulse formed from the leading edge of the square wave employed to trigger a delay multivibrator 154. Its square-wave output is differentiated at 155 and the pulse formed from the trailing edge of the square-wave output from multivibrator 154 is applied to trigger sweep generator 90 and also to trigger a gating multivibrator 156. This multivibrator produces a square-wave pulse which occurs when the receiver signal is expected. This square-wave pulse is applied to open the gate 91 whereby the receiver signals, amplified at 157, pass through the gate 91 to the vertical deflection plate of scope 35.

Referring to FIGS. 1 and 6, the receiver signals also are applied to the cathode of the cathode-ray tube of the oscilloscope 160 in order to obtain a record or display which represents a folded-out section of the inside of the borehole wall. In this respect, an orienting sensing device 161 is located in the tool 12 and coupled to the shaft 122 (FIG. 2) of the motor 16 for rotation therewith. This sensing device periodically senses direction as the motor 16 and hence the sleeve 15 are rotated in the borehole. As disclosed in the above-mentioned U.S. Pat. No. 3,369,626, circuitry coupled to the orienting device 161 produces and orienting signal each time the transmitter 13 and receiver 14 pass magnetic north. The orienting signal is transmitted to the surface by way of cable conductor 162. At the surface this signal is taken from conductor 162 by way of the slip rings and brushes 26 and 27 and applied to conductor 163 where it is amplified at 164 and applied to trigger a sweep generator 165. The output of generator 165 is applied to the horizontal deflection plate of the oscilloscope 160. Thus, during each rotation cycle of the transmitter 13 and receiver 14 there is produced across the screen 166 of the scope 160 an illuminating trace 167 indicative of the character of the borehole wall. Successive traces are stepped vertically and photographed by a camera 168 for the production of a two-dimensional print or display of successive traces.

The system for stepping the traces comprises a potentiometer 170, the arm of which is mechanically coupled through a gear reducer 171 and a drive means 172 to a reel 173 driven by the logging cable 25. As the cable 25 is moved continuously to move the tool 12 through the borehole, the contact of the potentiometer 170 moves across the resistance element, thereby generating a slowly changing sweep voltage which is applied to the vertical deflection plate of the oscilloscope 160. The inclined trace indicates the continuous change in depth of the logging tool. Each trace will begin at a height substantially where the preceding trace terminated.

Although not shown, a suitable arragement is provided to terminate, if desired, the pulsing and detection operation of the transmitter and receiver. These members are immersed in oil 180 (FIG. 2) confined by boot 181 secured to the tool structure 51 and 52.

Now that the invention has been described, modifications will become apparent to those skilled in the art and it is intended to cover such modifications as fall within the scope of the appended claims.

What is claimed is:

1. A borehole logging system comprising:
   an elongated borehole tool for insertion into a borehole,
   a first transducer located in said tool for directionally transmitting acoustic energy,
   a second transducer located in said tool for detecting acoustic energy,
   means for rotating said first and second transducers around the longitudinal axis of said tool for exploratory purposes,
   drive means for moving at least one of said transducers for varying the relationship between said transducers for adjustment purposes to enhance the detection of acoustic energy,
   power means located in said tool for imparting motion to said drive means,
   coupling means located in said tool for coupling and uncoupling said power means to and from said drive means, respectively, and
   means at the surface for controlling said coupling means from the surface for coupling said power means to said drive means to allow the relationship between said transducers to be varied and for uncoupling said power means from said drive means when it is desired to rotate said transducers around the longitudinal axis of said tool for exploratory purposes.

2. The system of claim 1 wherein:
   said first and second transducers are secured to first and second movable supports,
   said drive means being coupled to both of said supports for moving both of said supports and said transducers simultaneously for adjustment purposes.

3. The system of claim 1 wherein:
   said first and second transducers are secured to first and second supports, respectively, and
   means for pivotally supporting said first and second supports about first and second axes, respectively, parallel to each other and perpendicular to the longitudinal axis of said tool,
   said drive means comprising a rotatable shaft threadedly coupled to both of said supports for rotating said first and second supports about said first and second axes, respectively, in opposite directions upon rotation of said shaft.

4. The system of claim 3 wherein:
said coupling means comprises a magnetic clutch means for coupling and uncoupling said power means to and from said shaft,
said clutch means normally allowing said transducers to rotate about the longitudinal axis of said tool without causing said shaft to rotate about its axis,
said means at the surface comprising an energy source for energizing said clutch means and said power means.

References Cited

UNITED STATES PATENTS 3,371,313   2/1968   Zemanek   181—0.5
3,426,865   2/1969   Henry   181—0.5

RODNEY D. BENNETT, Jr., Primary Examiner

D. C. KAUFMAN, Assistant Examiner

U.S. Cl. X.R.

340—15.5, 18